United States Patent
Lee et al.

(10) Patent No.: US 9,761,875 B2
(45) Date of Patent: Sep. 12, 2017

(54) CATHODE ACTIVE MATERIAL FOR LITHIUM SECONDARY BATTERY AND LITHIUM SECONDARY BATTERY COMPRISING THE SAME

(71) Applicant: LG Chem, Ltd., Seoul (KR)

(72) Inventors: Yong-Seok Lee, Daejeon (KR); Duk-Hyun Ryu, Daejeon (KR); Jung-Jin Kim, Daejeon (KR)

(73) Assignee: LG Chem, Ltd. (KR)

( * ) Notice: Subject to any disclaimer, the term of this patent is extended or adjusted under 35 U.S.C. 154(b) by 302 days.

(21) Appl. No.: 14/420,057

(22) PCT Filed: Feb. 14, 2014

(86) PCT No.: PCT/KR2014/001229
§ 371 (c)(1),
(2) Date: Feb. 6, 2015

(87) PCT Pub. No.: WO2014/126416
PCT Pub. Date: Aug. 21, 2014

(65) Prior Publication Data
US 2015/0188121 A1    Jul. 2, 2015

(30) Foreign Application Priority Data

Feb. 14, 2013 (KR) .................. 10-2013-0015897
Feb. 14, 2014 (KR) .................. 10-2014-0016988

(51) Int. Cl.

| | |
|---|---|
| *H01M 4/58* | (2010.01) |
| *H01M 4/131* | (2010.01) |
| *H01M 4/505* | (2010.01) |
| *H01M 4/525* | (2010.01) |
| *H01M 4/62* | (2006.01) |
| *H01M 4/36* | (2006.01) |
| *C01G 45/12* | (2006.01) |
| *C01G 51/00* | (2006.01) |
| *C01G 53/00* | (2006.01) |

(52) U.S. Cl.
CPC ...... *H01M 4/5825* (2013.01); *C01G 45/1242* (2013.01); *C01G 51/54* (2013.01); *C01G 53/50* (2013.01); *H01M 4/131* (2013.01); *H01M 4/364* (2013.01); *H01M 4/505* (2013.01); *H01M 4/525* (2013.01); *H01M 4/621* (2013.01); *H01M 4/624* (2013.01); *C01P 2002/32* (2013.01); *C01P 2004/61* (2013.01); *Y02E 60/122* (2013.01)

(58) Field of Classification Search
CPC .... H01M 4/5825; H01M 4/364; H01M 4/505; H01M 4/525; H01M 4/621; H01M 4/624; Y02E 60/122; C01G 45/1242; C01G 51/54; C01G 53/50; C01P 2002/32; C01P 2004/61

See application file for complete search history.

(56) References Cited

U.S. PATENT DOCUMENTS

| | | | |
|---|---|---|---|
| 5,700,597 A | 12/1997 | Zhong et al. | |
| 6,699,623 B1 * | 3/2004 | Dai ...................... | H01M 4/663 429/231.1 |
| 8,173,303 B2 | 5/2012 | Cho et al. | |
| 2006/0093920 A1 * | 5/2006 | Cheon .................. | H01M 4/131 429/232 |
| 2006/0121350 A1 | 6/2006 | Kajiya et al. | |
| 2007/0190420 A1 | 8/2007 | Ryu et al. | |
| 2009/0289218 A1 | 11/2009 | Kajiya et al. | |
| 2011/0111297 A1 | 5/2011 | Sato et al. | |
| 2012/0177994 A1 | 7/2012 | Kim et al. | |
| 2012/0282513 A1 | 11/2012 | Schaefer et al. | |
| 2013/0146807 A1 | 6/2013 | Katsu et al. | |

FOREIGN PATENT DOCUMENTS

| | | |
|---|---|---|
| CN | 101764222 A | 6/2010 |
| CN | 102074678 A | 5/2011 |
| JP | H07-153496 A | 6/1995 |
| JP | 2000306577 A | 11/2000 |
| JP | 2002170565 A | 6/2002 |
| JP | 2002226213 A | 8/2002 |
| JP | 2003203678 A | 7/2003 |
| JP | 2005317551 A | 11/2005 |
| JP | 2006278322 A | 10/2006 |
| KR | 2012-0081808 A | 7/2012 |
| KR | 2012-0102631 A | 9/2012 |
| TW | 200421658 A | 10/2004 |
| WO | 2012-020647 A1 | 2/2012 |

OTHER PUBLICATIONS

International Search Report for PCT/KR2014/001229 dated Jun. 5, 2014.

* cited by examiner

*Primary Examiner* — Laura Weiner
(74) *Attorney, Agent, or Firm* — Lerner, David, Littenberg, Krumholz & Mentlik, LLP

(57) ABSTRACT

The present disclosure relates to a cathode active material, and more particularly, to a cathode active material doped with a trivalent metal (Me) and a lithium secondary battery comprising the same. According to one aspect, there is provided the cathode active material doped with the trivalent metal (Me), represented by the formula $Li_xMn_2Me_yO_4$ (here, x is from 0.5 to 1.3, and y is from 0.01 to 0.1). According to the present disclosure, release of manganese ions of the cathode active material greatly reduces, and consequently, capacity and cycle life of the battery may be significantly improved.

5 Claims, 7 Drawing Sheets

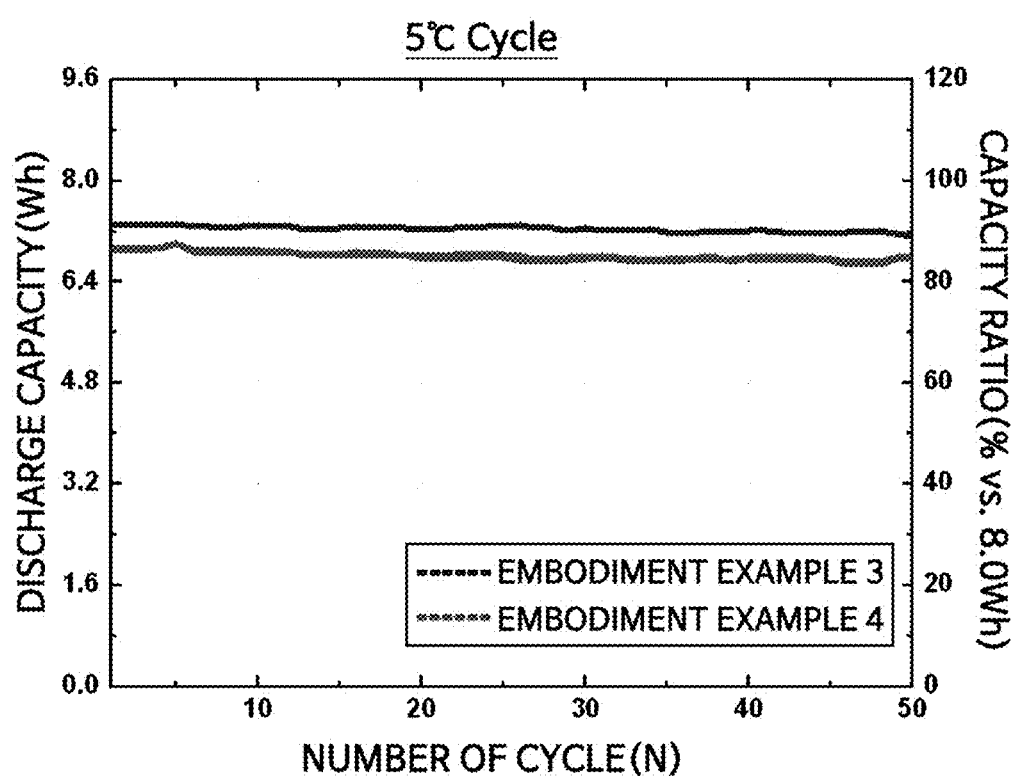

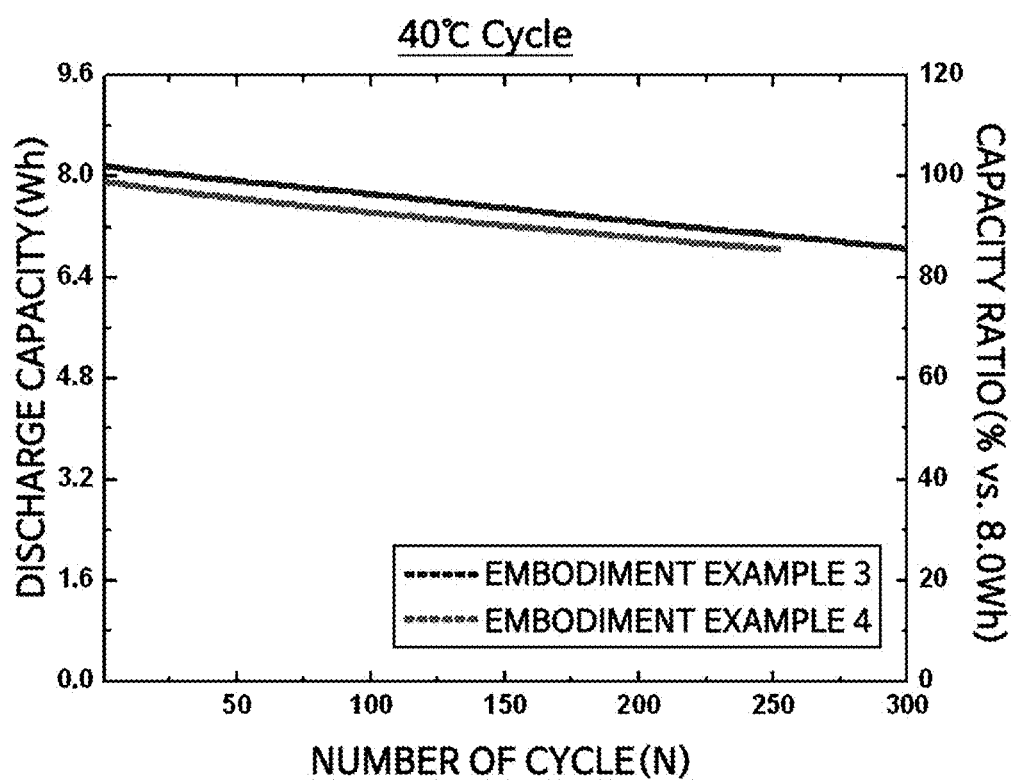

CATHODE ACTIVE MATERIAL FOR LITHIUM SECONDARY BATTERY AND LITHIUM SECONDARY BATTERY COMPRISING THE SAME

CROSS-REFERENCE TO RELATED APPLICATION

This application is a national phase entry under 35 U.S.C. §371 of International Application No. PCT/KR2014/001229, filed Feb. 14, 2014, which claims priority to Korean Patent Application No. 10-2013-0015897, filed Feb. 14, 2013 and Korean Patent Application No. 10-2014-0016988, filed Feb. 14, 2014, the disclosures of which are incorporated herein by reference.

TECHNICAL FIELD

The present disclosure relates to a cathode active material for a lithium secondary battery, and more particularly, a cathode comprising a cathode active material doped with a trivalent metal (Me) and a lithium secondary battery comprising the cathode.

BACKGROUND ART

Recently, there has been growing interest in energy storage technologies. As the application fields of energy storage technologies have been extended to mobile phones, camcorders, laptop computers, and even electric cars, efforts have increasingly been made towards the research and development of electrochemical batteries. In this aspect, electrochemical devices have attracted the most attention. The development of rechargeable secondary batteries has been the focus of particular interest. Many secondary batteries are currently available. Of these, lithium secondary batteries developed in the early 1990's are gaining attention due to their advantages of a higher operating voltage and a higher energy density than traditional batteries such as Ni-MH batteries.

Generally, lithium secondary batteries are fabricated by using a material allowing intercalation/deintercalation of lithium ions or alloying/dealloying for an anode and a cathode and filling an organic electrolyte solution or polymer electrolyte solution in between the anode and the cathode, and generates electrical energy by an oxidation/reduction reaction during intercalation/deintercalation of lithium ions in the cathode and the anode.

Currently, as an electrode active material (that is, a cathode active material) of a cathode of lithium secondary batteries, a cathode active material using nickel, manganese, cobalt, and the like, in particular, a lithium-manganese composite oxide cathode active material containing manganese (Mn) such as $LiMn_2O_4$ and $LiMnO_2$ is gaining much attention for the reasons of lower production costs and less environmental pollution due to high capacity characteristics. However, a lithium secondary battery using a lithium-manganese composite oxide cathode active material has a drawback of a significant reduction in battery capacity during repeated charge/discharge cycles of the battery due to release of Mn ions at high temperature above about 40° C.

During battery discharging, $Mn^{3+}$ ions in excess exist on a surface, and the capacity drastically reduces due to transition of $Mn^{3+}$ from a cubic structure to a tetragonal structure by the Jahn-Teller effect. Also, $Mn^{3+}$ undergoes a disproportionation reaction ($2Mn^{3+}$->$Mn^{4+}+Mn^{2+}$). In this disproportionation reaction, $Mn^{4+}$ combines with lithium ions in an electrolyte to form electrochemically inactive $Li_2MnO_3$, and $Mn^{2+}$ ions are dissociated (dissolved) in an electrolyte solution, consequently, an amount of cathode active materials reduces. Thereby, the released manganese ions are electrodeposited in a form of metallic manganese on an anode surface, and block the movement of lithium ions, causing an increase in resistance, or act as a catalyst to cause reduction and decomposition of the electrolyte, thereby greatly reducing battery capacity and cycling and storage characteristics of the battery. Particularly, when overcharged at high temperature, the capacity reduces rapidly, and this is because a catalystic reaction is accelerated.

As a solution to this, attempts have been made to diffuse a lithium metal (in a shape of a plate or a foil) by a direct bond to a perforated current collector (for example, a foil), or to predope a lithium metal through a short between electrode active materials. However, use of the perforated current collector causes problems, for example, a reduction in a loading amount of electrode active materials, leading to capacity reduction, and a reduction in a contact area of the electrode active material with the current collector which, in turn, increases resistance to an electric current. Also, in the case of a certain cathode active material for high capacity, a problem occurs, for example, collapse of a crystal structure depending on a voltage region range, and resulting metal ions are known as degrading a solid electrolyte interface (SEI) layer generated on an anode surface.

Also, Japanese Patent Publication No. 7-153496 teaches that release of manganese ions in an electrolyte of a battery is prevented by adding at least one compound selected from the group consisting of BaO, MgO, and CaO to lithium manganese composite oxide. However, in practice, the above problem is difficult to solve sufficiently, and addition of an insulating compound causes a side effect of a reduction in initial output in the fabrication of a battery for high output.

DISCLOSURE

Technical Problem

The present disclosure is designed to solve the above problem, and therefore, the present disclosure is directed to providing a cathode active material that may suppress release of manganese ions caused by $Mn^{3+}$, and a cathode and a lithium secondary battery comprising the same. These and other objects and advantages of the present disclosure will be better understood by the following detailed description. Also, it will become apparent that the objects and advantages of the present disclosure may be realized by means or methods set forth in the appended claims and combinations thereof.

Technical Solution

To achieve the object, the present disclosure provides a cathode for a lithium secondary battery including a lithium manganese oxide-type cathode active material doped with a trivalent metal (Me), represented by the following chemical formula 1:

$$Li_xMn_2Me_yO_4 \hspace{2cm} \text{[Chemical formula 1]}$$

where x is from 0.5 to 1.3, and y is from 0.01 to 0.1.

The trivalent metal (Me) is one selected from the group consisting of Al, Co, Cr, Fe, Ni, Mg, and Ti. Preferably, the trivalent metal (Me) is Al or Co.

The lithium manganese oxide-type cathode active material is in a form of particles having an average diameter of 20 μm to 25 μm.

The cathode may further include a binder resin, a binder, and a conductive material.

According to another aspect of the present disclosure, the cathode further includes a nickel-manganese-cobalt ternary system cathode active material represented by the following chemical formula 2:

$Li_aNi_{1-z-w}Mn_zCo_wO_b$ [Chemical formula 2]

where a is from 0.95 to 1.1, z is from 0.1 to 0.9, w is 0.1 to 0.9, and b is from 1 to 2.

A content ratio of the lithium manganese oxide-type cathode active material represented by the above chemical formula 1 and the nickel-manganese-cobalt ternary system cathode active material represented by the above chemical formula 2 is from 1:9 to 9:1 based on a weight ratio.

Also, the present disclosure provides a cathode for a lithium secondary battery including a cathode active material mixture of a lithium manganese oxide-type cathode active material doped with a trivalent metal (Me) and a nickel-manganese-cobalt ternary system cathode active material.

A content ratio of the lithium manganese oxide-type cathode active material and the ternary system cathode active material is from 1:9 to 9:1 based on a weight ratio.

The trivalent metal (Me) is one selected from the group consisting of Al, Co, Cr, Fe, Ni, Mg, and Ti.

The lithium manganese oxide-type cathode active material is represented by the following chemical formula 1:

$Li_xMn_2Me_yO_4$ [Chemical formula 1]

where x is from 0.5 to 1.3, and Me is a trivalent metal.

Also, the ternary system cathode active material is represented by the following chemical formula 2:

$Li_aNi_{1-z-w}Mn_zCo_wO_b$ [Chemical formula 2]

where a is from 0.95 to 1.1, z is from 0.1 to 0.9, w is 0.1 to 0.9, and b is from 1 to 2.

Also, the present disclosure provides a lithium secondary battery including a cathode, an anode, and a separator interposed between the cathode and the anode, wherein the cathode is a cathode according to the present disclosure.

Advantageous Effects

A cathode according to the present disclosure greatly reduces release of manganese ions of a cathode active material, resulting in significant improvements in capacity and cycle life of a battery.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

FIGS. 2a through 2d are graphs depicting cycle characteristics versus temperature for batteries fabricated in Embodiment examples 3 and 4.

DESCRIPTION OF THE PREFERRED EMBODIMENT

Figure 1:
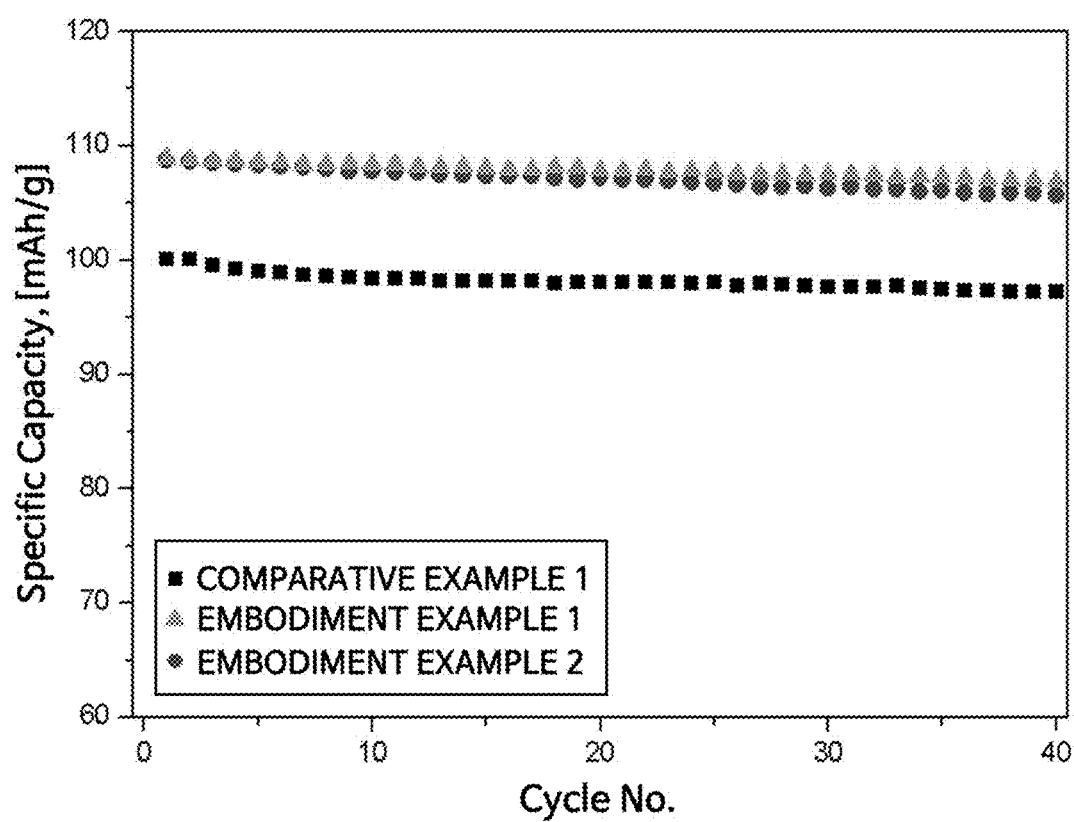
FIG. 1 is a graph plotting capacity value (mAh/g) versus cycle number for batteries fabricated in Embodiment example 1, Embodiment example 2, and Comparative example 1.
Figure 2B:
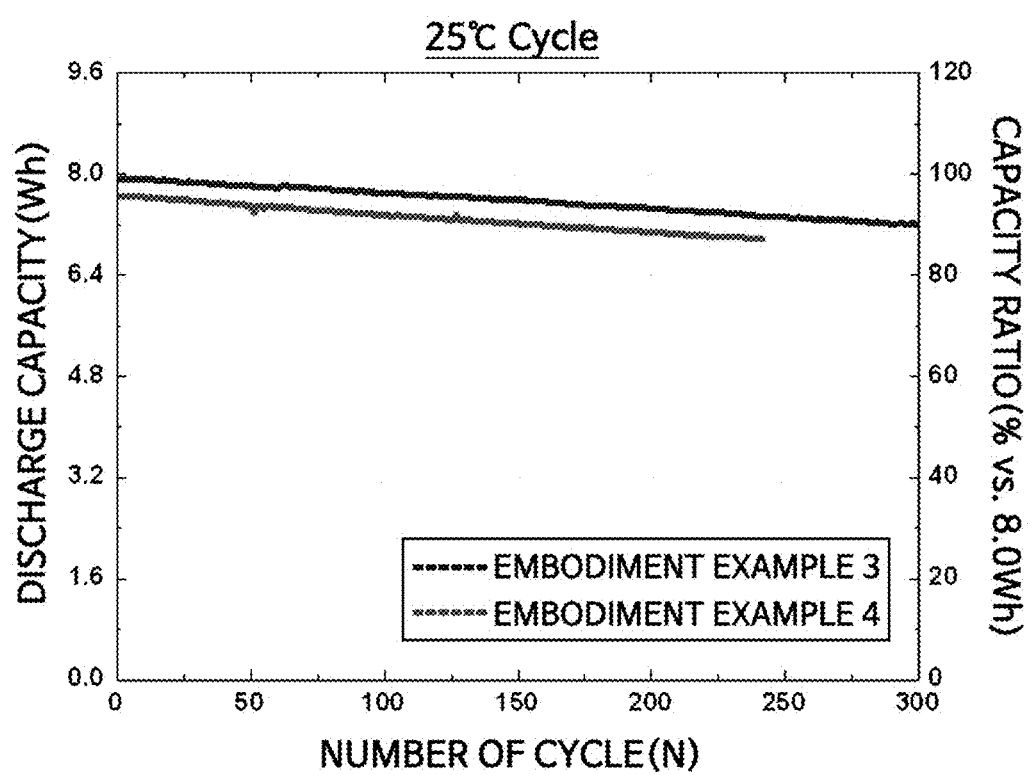
Figure 2D:
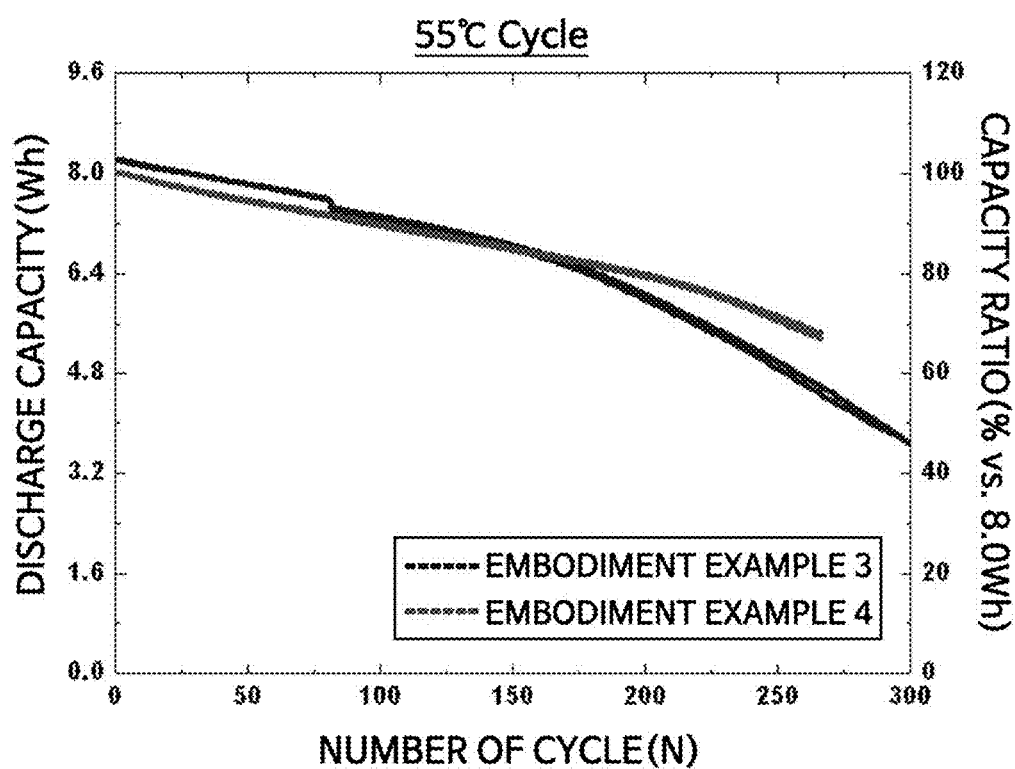

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Generally, a cathode active material known in the art includes a layered cathode active material, for example, $LiCoO_2$, $LiNiO_2$, $LiNi_{1-y}Co_yO_2(0<y<1)$, $LiMO_2(M=Mn, Fe)$, $Li(Ni_aCo_bMn_c)O_2(0<a<1, 0<b<1, 0<c<1, a+b+c=1)$, $LiNi_{1-y}Mn_yO_2(0≤y<1)$; a spinel-type cathode active material, for example, $LiMn_2O_4$, $LiMn_{2-z}Co_zO_4(0<z<2)$, $LiMn_{2-z}Ni_zO_4(0<z<2)$, $Li(Ni_aCo_bMn_c)O_4(0<a<2, 0<b<2, 0<c<2, a+b+c=2)$; an olivine-type cathode active material, for example, $LiCoPO_4$, $LiFePO_4$, and the like.

As a manganese-containing lithium oxide cathode active material having rich resources, low costs, an environmental friendly material, excellent cycle characteristics, and high safety, a LMO-based cathode active material, that is, $LiMn_2O_4$ has been widely used. However, there was a problem such as a battery capacity reduction due to a distortion phenomenon by the Jahn-Teller effect.

To solve this problem, in a LMO-based cathode active material, a method of substituting manganese ions with transition metal ions having an oxidation number smaller than or equal to +3 or lithium ions was used. For instance, a cathode active material such as $LiM_xMn_{2-x}O_4$(M is a transition metal), for example, $LiCo_xMn_{2-x}O_4(0<x<2)$, $LiNi_xMn_{2-x}O_4(0<x<2)$, or the like, was developed and has been used. In these cathode active materials, when a metal having an oxidation number smaller than or equal to +3 substitutes for a Mn position, an average valence of manganese increases, which provides structural stability and greatly improves life characteristics, but a capacity reduction caused by the release of manganese ions still remains as a problem to be solved.

Under this situation, according to one aspect of the present disclosure, a cathode including a lithium manganese oxide-type (hereinafter referred to as 'LMO-type') cathode active material represented by the following chemical formula 1 is provided:

$Li_xMn_2Me_yO_4$ [Chemical formula 1]

According to one particular embodiment of the present disclosure, the cathode active material is a doped with a trivalent metal (Me). Also, the trivalent metal (Me) is one selected from the group consisting of Al, Co, Cr, Fe, Ni, Mg, and Ti. Preferably, the trivalent metal (Me) is Al or Co.

In the above formula, x is from about 0.5 to about 1.3, and y is from about 0.01 to about 0.1. Particularly, when y falls within the above range in the formula, it may prevent $Mn^{3+}$ in the cathode active material from dissolving or dissociating in an electrolyte in a form of $Mn^{2+}$ or $Mn^{4+}$ by a disproportionation reaction (for example, reduction). In contrast, when y is less than 0.01, it may be difficult to achieve the structural stability and side reaction suppression as described previously, and when y exceeds 0.1, because an amount of transition metals affecting capacity is relatively lower, battery capacity may reduce, hence it is not preferred. Accordingly, a battery using this may have improvements in cycle characteristics and stability.

In the cathode active material, an average particle diameter may be from about 20 μm to about 25 μm. When the average particle diameter of the cathode active material is within the above range, it may prevent $Mn^{3+}$ in the cathode active material from dissolving (dissociating) in an electrolyte by a disproportionation reaction (for example, reduction). Accordingly, a battery using this may have improvements in cycle characteristics and stability.

This cathode active material may be manufactured by methods known in the art. For instance, the cathode active material may be manufactured by, for example, but not limited to, a solid state method, carbonate co-precipitation, an emulsion method, a sol-gel method, and the like.

According to another embodiment of the present disclosure, a lithium secondary battery including a cathode containing the above cathode active material, an anode, and a separator interposed between the cathode and the anode is provided.

Meanwhile, in one particular embodiment of the present disclosure, according to another aspect of the present disclosure, the cathode may further include a nickel-manganese-cobalt ternary system (hereinafter referred to as 'NMC-type') cathode active material represented by the following chemical formula 2:

$$Li_aNi_{1-z-w}Mn_zCo_wO_b \qquad \text{[Chemical formula 2]}$$

In chemical formula 2, a is from 0.95 to 1.1, z is from 0.1 to 0.9, w is 0.1 to 0.9, and b is from 1 to 2.

In one particular embodiment of the present disclosure, a content ratio of the LMO-type cathode active material and the NMC-type cathode active material in the cathode is not particularly limited, but is preferably from 1:99 to 99:1, or from 10:90 to 90:10, or from 30:70 to 70:30, based on a weight ratio.

The content ratio may change based on a purpose of end use, a usage environment, or a use condition of the fabricated lithium secondary battery. For example, in case the battery is used under a room temperature condition, because output characteristics are improved with an increasing amount of LMO-type cathode active materials, it is preferred to increase a ratio of an amount of LMO-type cathode active materials.

Figure 3:
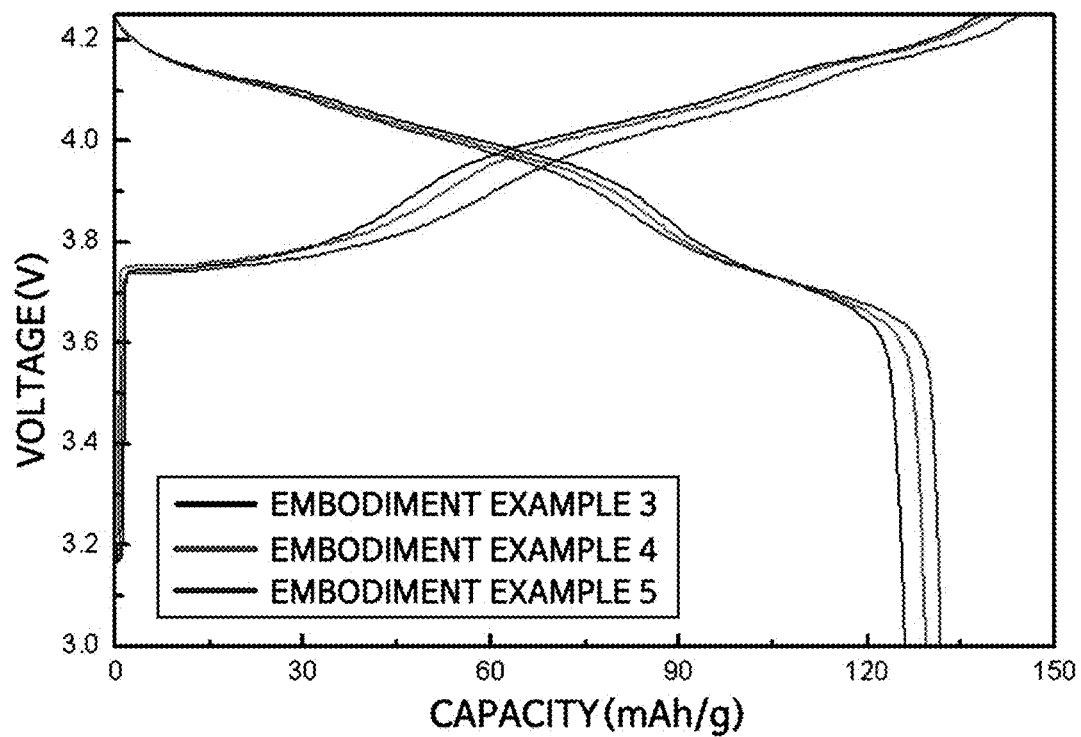
FIG. 3 shows charge/discharge profiles based on a content ratio of a cathode active material in batteries fabricated in Embodiment examples 3 through 5.
Figure 4:
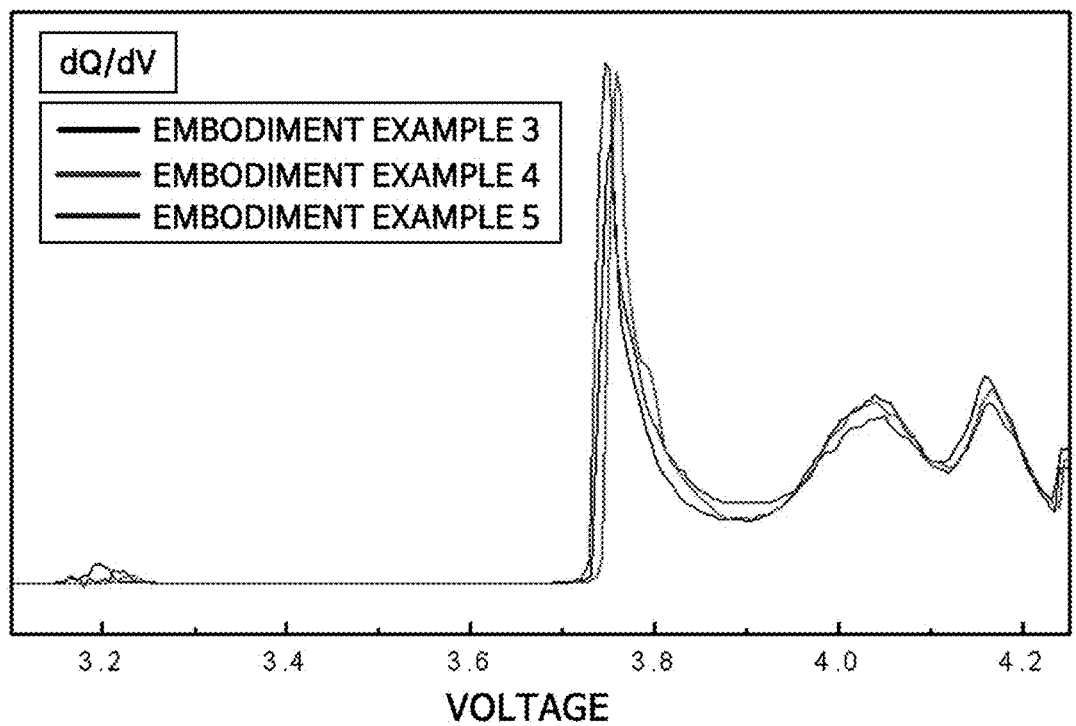
FIG. 4 is a graph illustrating a differential capacity curve based on a content ratio of a cathode active material in batteries fabricated in Embodiment examples 3 through 5.

FIG. 3 shows charge/discharge profiles of batteries of Embodiment examples 3 through 5 fabricated using a mixed cathode of a mixture of an LMO-type cathode active material and an NMC-type cathode active material. According to the graph, it is found that as an amount of LMO-type cathode active materials among the cathode active materials increases, a potential of a plateau zone in the discharge profile of the battery tends to increase. Also, FIG. 4 is a graph plotting a differential capacity curve of the batteries of Embodiment examples 3 through 5.

Here, in the case of Embodiment example 3 in which a content ratio of an LMO-type cathode active material is high, a reaction time at around 4.2V tends to prolong, whereas in the case of Embodiment example 5 in which a content ratio of an NMC-type cathode active material is high, a reaction time at 3.7V tends to prolong. Accordingly, in the case of a battery generally used under a room temperature condition, it is preferred to increase a content ratio of an LMO-type cathode active material or use an LMO-type cathode active material alone.

Meanwhile, in a high temperature condition, release of manganese increases, causing output characteristics to deteriorate. Accordingly, in the case of a battery applied in a long-term usage environment under a temperature condition of approximately 50° C. or higher, in the viewpoint of compensation for a capacity decrease caused by manganese release, battery performance may be improved by increasing a content of an NMC-type cathode active material in the cathode. FIGS. 2a through 2d are graphs depicting cycle characteristics versus temperature condition for batteries fabricated in Embodiment examples 3 and 4. According to FIGS. 2a through 2d, in case a content of an LMO-type cathode active material is high under a temperature condition of 5° C., a discharge capacity is found to be high.

However, it is found that a difference in discharge capacity between the battery of Embodiment example 3 and the batter of Embodiment example 4 tends to reduce with increasing temperature. Also, it is found that a reduction in discharge capacity based on a cycle number appears more remarkably in a temperature condition of 55° C., and cycle characteristics of the battery of Embodiment example 3 tends to drop behind the battery of Embodiment example 4 in the proximity of about 150 cycles. Accordingly, in the case of a battery used in a high temperature condition, battery performance degradation caused by capacity reduction due to manganese release in an LMO-type cathode active material may be prevented by a method of increasing a content ratio of an NMC-type cathode active material.

Also, the present disclosure provides a cathode for a lithium secondary battery containing the cathode active material and a secondary battery including the same.

The lithium secondary battery generally includes unit cells each including an anode, a separator, and a cathode, and basically, the lithium secondary battery includes at least one unit cell, preferably, a plurality of unit cells. The unit cell may include at least one unit cell structure in which a separator is interposed between electrodes of opposite polarities and both outermost electrodes have different polarities, or may include at least one unit cell structure in which a separator is interposed between electrodes of opposite polarities and both outermost electrodes have the same polarity.

In one embodiment of the present disclosure, the anode is not particularly limited, and may be manufactured by binding an anode active material (generally, assuming a particulate form) to a current collector by a common method known in the art.

A non-limiting example of the anode active material may include a general anode active material conventionally used in an anode of an electrochemical device, in particular, for example, carbons such as petroleum coke, activated carbon, graphite, non-graphitizable carbon, and graphite-based carbon; metal composite oxides such as $Li_xFe_2O_3 (0<x\leq1)$, $Li_xWO_2 (0<x\leq1)$, $Sn_xMe_{1-x}Me'_yO_z$ (Me: Mn, Fe, Pb, Ge; Me': Al, B, P, Si, elements in Groups 1, 2, and 3 of the periodic table, halogen; $0<x\leq1$; $1\leq y\leq3$; $1\leq z\leq8$); lithium metals; lithium alloys; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$;

conductive polymers such as polyacetylene; Li—Co—Ni based materials, preferably, non-carbon based materials such as Si, Sn, and the like.

Generally, the separator has a shape of a porous membrane having a plurality of pores. The porous separator is not particularly limited, and may be manufactured in a form of a film or a non-woven or woven fabric by a common method known in the art. A non-limiting example of the separator may be a type of a film or a non-woven or woven fabric made from any one polymer selected from the group consisting of polyethylene, polypropylene, polyethyleneterephthalate, polybutyleneterephthalate, polyester, polyacetal, polyamide, polycarbonate, polyimide, polyetheretherketone, polyaryletherketone, polyetherimide, polyamideimide, polybenzimidazole, polyethersulfone, polyphenyleneoxide, cyclic olefin copolymer, polyphenylenesulfide, and polyethylenenaphthalene, or mixtures thereof.

Also, the porous separator may further include a porous coating layer including inorganic particles and a binder, as known in the art. The inorganic particles are selected from the group consisting of an inorganic particle having a dielectric constant greater than or equal to 5, an inorganic particle having a lithium ion delivery capability, and a mixture thereof. The binder may be any one selected from the group consisting of polyvinylidene fluoride (PVDF), polyacrylic acid (PAA), polyethylene glycol (PEG), polypropylene glycol (PPG), toluene diisocyanate (TDI), polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidenefluoride, polyacrylonitrile, and styrene butadiene rubber (SBR), or mixtures thereof, but is not limited thereto.

The electrolyte solution usable in the present disclosure includes a salt, for example, of $A^+B^-$ structure. Here, $A^+$ includes an ion including an alkali metal cation such as $Li^+$, $Na^+$ and $K^+$, or combinations thereof, preferably, $Li^+$ ion. $B^-$ includes an ion including an anion such as $F_{31}Cl^-$, $Br^-$, $I^-$, $NO_3^-$, $BF_4^-$, $PF_6^-$, $N(CN)_2^-$, $SCN^-$, $ClO_4^-$, $AsF_6^-$, $CF_3SO_3^-$, $(CF_3SO_2)_2^-$, $C(CF_2SO_2)_3^-$, $(CF_3)_3PF_3^-$, $(CF_3)_4PF_2^-$, $(CF_3)_5PF^-$, $(C^F_3)_6P^-$, $(CF_3CF_2SO_2^-)_2N^-$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$, and $CH_3CO_2^-$, or combinations thereof. Preferably, a salt of $A^+B^-$ structure is a lithium salt.

The salt of $A^+B^-$ structure is dissolved or dissociated in an organic solvent. An example of the organic solvent includes, without limitation, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethylcarbonate (EMC), and gamma butyrolactone, or mixtures thereof.

The electrode used in the present disclosure may be manufactured by a manufacturing method generally used in the art. For example, after an electrode active material, a binder, a solvent, and according to necessity, a conductive material and a dispersant are mixed and stirred to prepare a slurry, the slurry may be applied to a current collector, followed by compression, as a consequence, an electrode may be manufactured. In the electrode active material, a description of a cathode active material and an anode active material is as described above.

As the binder, polyvinylidene fluoride, polyvinylalcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butyrene rubber, fluoro rubber (fluoro elastomer), and various copolymers may be used.

A non-limiting example of the solvent may include acetone, tetrahydrofuran, methylene chloride, chloroform, dimethylformamide, N-methyl-2-pyrrolidone (NMP), cyclohexane, and water, or mixtures thereof. These solvents provide a proper level of viscosity to form a slurry coating layer on a surface of a current collector at a desired level.

As the conductive material and the dispersant, ones known in the art and generally being used may be used without limitation. For example, the conductive material may be additionally mixed with cathode active material particles. The conductive material may be added in an amount of, for example, 1 to 50 wt %, based on a total weight of a mixture including a cathode active material. The conductive material is not particularly limited if it has high conductivity while not causing a chemical change in a battery, and may use, for example, graphite such as natural graphite and artificial graphite; carbon black such as carbon black, acetylene black, Ketjen black, channel black, furnace black, lamp black, and thermal black; conductive fiber such as carbon fiber and metal fiber; metal powder such as fluoro carbon, aluminum, and nickel powder; conductive whisker such as zinc oxide and potassium titanate; conductive oxide such as titanium oxide; a conductive material such as a polyphenylene derivative, and the like.

The cathode current collector is not limited to a specific type if it is conductive while not causing a chemical change in a corresponding battery, and may be manufactured by, as a non-limiting example, stainless steel, aluminum, nickel, titanium, sintered carbon, and aluminum or stainless steel treated with carbon, nickel, titanium or silver on the surface thereof, or combinations thereof. Meanwhile, the anode current collector is not limited to a specific type if it is conductive while not causing a chemical change in a corresponding battery, and may be manufactured by, as a non-limiting example, copper, gold, stainless steel, aluminum, nickel, titanium, sintered carbon, copper or stainless steel treated with carbon, nickel, titanium or silver on the surface thereof, and an aluminum-cadmium alloy, or combinations thereof.

The current collector may have a fine surface texture to enhance the adhesion of the cathode active material, and may be in various shapes, for example, a film, a sheet, a foil, a net, a porous product, a foam, a non-woven product, and the like.

In the fabrication of the battery, injection of the electrolyte solution may be performed in a proper step among a battery fabrication process based on a manufacturing process and required physical properties of a final product. That is, injection of the electrolyte solution may be applied before battery assembling or in a final step of battery assembling.

Hereinafter, the present disclosure is described in detail through examples for the purpose of specific description. However, exemplary embodiments according to the present disclosure may be embodied in many different forms, and the scope of the present disclosure should not be construed as limited to the exemplary embodiments set forth below. Rather, these exemplary embodiments are provided so that the present disclosure will be thorough and complete, and will fully convey the scope of the present disclosure to those skilled in the art.

MANUFACTURING EXAMPLE 1

Lithium carbonate ($Li_2CO_3$), manganese oxide ($Mn_3O_4$), and aluminum hydroxide ($Al(OH)_3$) were mixed at a mole ratio of 1.10:1.95:0.05, and pulverized. The pulverized mixture was heated at temperature of about 450° C. for about 5 hours, and after then, was heated again at 550° C. for about 5 hours. Subsequently, the result was cooled down and pulverized, and after the result was sintered at about 650° C. for 20 hours, the result was cooled down again to room temperature for about 3 hours, as a result, yielding an aluminum-doped lithium manganese composite oxide-type cathode active material of a spinel structure.

MANUFACTURING EXAMPLE 2

A cobalt-doped lithium manganese composite oxide-type cathode active material was obtained by performing the same method as the manufacturing example 1, except that cobalt hydroxide ($Co(OH)_3$) was used instead of aluminum hydroxide ($Al(OH)_3$).

MANUFACTURING EXAMPLE 3

Lithium carbonate ($Li_2CO_3$), manganese oxide ($Mn_3O_4$), and cobalt hydroxide ($(OH)_3$) were mixed at a mole ratio of 1.10:1.95:0.05, and pulverized. The pulverized mixture was heated at temperature of about 450° C. for about 5 hours, and after then, was heated again at 550° C. for about 5 hours. Subsequently, the result was cooled down and pulverized, and after the result was sintered at about 650° C. for 20 hours, the result was cooled down again to room temperature for about 3 hours, as a result, yielding a nickel-manganese-cobalt composite oxide-type cathode active material ($LiNi_{0.5}Mn_{0.3}Co_{0.2}O_2$) of a spinel structure.

MANUFACTURING EXAMPLE 4

A cathode active material was obtained by performing the same method as the manufacturing example 1, except that lithium hydroxide and manganese dioxide were used at a mole ratio of 1:2, instead of lithium carbonate ($Li_2CO_3$), manganese oxide ($Mn_3O_4$), and aluminum hydroxide ($Al(OH)_3$).

EMBODIMENT EXAMPLE 1

The cathode active material obtained in the manufacturing example 1 was applied to an aluminum foil to prepare a cathode. Also, an anode in which a graphite anode active material was applied to a copper foil as an anode current collector was prepared, a porous polyethylene film as a separator was interposed between the cathode and the anode, and theses were rolled up to manufacture a unit cell, and at least one unit cell was prepared.
An electrolyte solution containing 1M $LiPF_6$ as a lithium salt and a mixture of ethylene carbonate (EC) and diethyl carbonate (DEC) at a volumetric ratio of 30:70 as an organic solvent was injected into the prepared unit cell to fabricate a lithium secondary battery.

EMBODIMENT EXAMPLE 2

A lithium secondary battery was fabricated by the same method as Embodiment example 1, except that the cathode active material obtained in the manufacturing example 2 was used.

EMBODIMENT EXAMPLE 3

A cathode active material mixture of the cathode active material obtained in the manufacturing example 1 and the cathode active material obtained in the manufacturing example 3 at a weight ratio of 60:40 was applied to an aluminum foil to prepare a cathode. Also, an anode in which a graphite anode active material was applied to a copper foil as an anode current collector was prepared, a porous polyethylene film as a separator was interposed between the cathode and the anode, and theses were rolled up to manufacture a unit cell, and at least one unit cell was prepared. An electrolyte solution containing 1M $LiPF_6$ as a lithium salt and a mixture of ethylene carbonate (EC) and diethyl carbonate (DEC) at a volumetric ratio of 30:70 as an organic solvent was injected into the prepared unit cell to fabricate a lithium secondary battery.

EMBODIMENT EXAMPLE 4

A lithium secondary battery was fabricated by the same method as Embodiment example 2, except that a cathode active material mixture of the cathode active material obtained in the manufacturing example 1 and the cathode active material obtained in the manufacturing example 3 at a weight ratio of 55:45 was used.

EMBODIMENT EXAMPLE 5

A lithium secondary battery was fabricated by the same method as Embodiment example 2, except that a cathode active material mixture of the cathode active material obtained in the manufacturing example 1 and the cathode active material obtained in the manufacturing example 3 at a weight ratio of 50:50 was used.

COMPARATIVE EXAMPLE 1

A lithium secondary battery was fabricated by the same method as Embodiment example 1, except that the cathode active material obtained in the manufacturing example 4 was used.

Experimental Result

1) Initial Efficiency and Capacity Retention Ratio

The batteries of Embodiment example 1, Embodiment example 2, and Comparative example 1 were each charged with a constant current up to 5 mV at a current density of 0.1 C and after then, uniformly maintained at a constant voltage of 5 mV, and when the current density reaches 0.005 C, charging was finished. In the discharge, discharging was completed in a CC mode to 1.5V at a current density of 0.1 C. Charging and discharging was repeated 40 times under the same condition, and charge and discharge characteristics were measured. FIG. 1 is a graph plotting capacity value (mAh/g) versus cycle number for the batteries of Embodiment examples 1 and 2, and the battery of Comparative example 1. Referring to FIG. 1, the batteries of Embodiment examples 1 and 2 doped with aluminum and cobalt, respectively, exhibited excellent initial efficiency and capacity retention ratio (40 cycles) when compared to the non-doped battery of Comparative example 1. This is summarized in the following Table 1.

TABLE 1

| | Embodiment example 1 | Embodiment example 2 | Comparative example 1 |
|---|---|---|---|
| Active material particle diameter ($D_{50}$ on 270 mesh)(μm) | 22.95 | 22.15 | 23.81 |
| Initial efficiency (%) | 98.8 | 98.8 | 98.1 |
| Capacity retention ratio (40 cycles)(%) | 97.0 | 97.1 | 96.2 |

2) Evaluation of Capacity Retention Ratio Based on Temperature for Mixed Cathode The capacity retention ratio was investigated by measuring cycle life characteristics at 5° C., 25° C., 40° C., and 55° C. using the batteries fabricated in Embodiment examples 3 and 4. For each battery, charging with current of 0.7 C and discharging to 0.5 CP were repeated for 300 cycles, and the results were shown in FIGS. 2a through 2d. According to FIGS. 2a through 2d, under a condition between room temperature and about 40° C., the battery of Embodiment example 3 showed a relatively high discharge capacity versus cycle number, but a similar capacity retention change tendency appeared in the batteries of Embodiment examples 3 and 4 (there was no big difference in gradient between both graphs). However, with increasing temperature, the batteries of Embodiment examples 3 and 4 tended to gradually reduce in a discharge capacity difference, and the battery of Embodiment example 3 showed a more remarkable reduction in discharge capacity versus cycle number at high temperature of about 55° C. or higher, when compared to the battery of Embodiment example 4.

3) Evaluation of Cycle Characteristics for Mixed Cathode

The batteries fabricated in Embodiment examples 3 through 5 were each charged with a constant current of 0.2 C at 25° C. up to 4.2V and after then, uniformly maintained at a constant voltage of 4.2V, and when the current density reaches 1/20 C, charging was finished. Subsequently, discharging was performed with a constant current of 0.2 C up to 3V. After repeating charging and discharging for 150 cycles, charge and discharge characteristics of the battery were measured, and charge/discharge profiles and differential capacity curves were plotted on FIGS. 3 and 4, respectively. According to this, under a room temperature condition, it was found, as described in the foregoing, that the battery of Embodiment example 3 having a high content ratio of the LMO-type cathode active materials showed a longer reaction time at a high potential 4.2V zone than Embodiment example 5.

What is claimed is:

1. A cathode for a lithium secondary battery, comprising: a lithium manganese oxide-type cathode active material doped with a trivalent metal (Me), represented by the following chemical formula 1 and a nickel-manganese-cobalt ternary system cathode active material represented by the following chemical formula 2:

$Li_xMn_2Me_yO_4$         [Chemical formula 1]

where x is from 0.5 to 1.3, and y is from 0.01 to 0.1, $Li_aNi_{1-z-w}Mn_zCo_wO_b$         [Chemical formula 2]

where a is from 0.95 to 1.1, z is from 0.1 to 0.9, w is 0.1 to 0.9, and b is from 1 to 2, wherein the trivalent metal (Me) is one selected from the group consisting of Al, Co, Cr, Fe, Ni, Mg, and Ti, wherein a content ratio of the lithium manganese oxide-type cathode active material represented by the above chemical formula 1 and the nickel-manganese-cobalt ternary system cathode active material represented by the above chemical formula 2 is from 1:9 to 9:1 based on a weight ratio.

2. The cathode for the lithium secondary battery according to claim 1, wherein the trivalent metal (Me) is Al or Co.

3. The cathode for the lithium secondary battery according to claim 1, wherein the lithium manganese oxide-type cathode active material is in a form of particles having an average diameter of 20 μm to 25 μm.

4. The cathode for the lithium secondary battery according to claim 1, wherein the cathode further comprises a binder, and a conductive material.

5. A lithium secondary battery comprising:
a cathode;
an anode; and
a separator interposed between the cathode and the anode, wherein the cathode is defined in claim 1.

* * * * *